US012359583B2

(12) United States Patent
Wirth et al.

(10) Patent No.: US 12,359,583 B2
(45) Date of Patent: Jul. 15, 2025

(54) AIRCRAFT ENGINE AND METHOD FOR TEMPERING A FAN BLADE AND/OR AN INTAKE CONE

(71) Applicant: Rolls-Royce Deutschland Ltd & Co KG, Blankenfelde-Mahlow (DE)

(72) Inventors: Moritz Wirth, Berlin (DE); Kyle Kelly, Berlin (DE)

(73) Assignee: ROLLS-ROYCE DEUTSCHLAND LTD & CO KG, Blankenfelde-Mahlow (DE)

(*) Notice: Subject to any disclaimer, the term of this patent is extended or adjusted under 35 U.S.C. 154(b) by 0 days.

(21) Appl. No.: 18/532,339

(22) Filed: Dec. 7, 2023

(65) Prior Publication Data

US 2024/0110486 A1 Apr. 4, 2024

(30) Foreign Application Priority Data

Dec. 9, 2022 (DE) .................... 10 2022 132 856.2

(51) Int. Cl.
*F01D 11/02* (2006.01)
*F01D 25/02* (2006.01)

(52) U.S. Cl.
CPC .............. *F01D 11/02* (2013.01); *F01D 25/02* (2013.01); *F05D 2220/323* (2013.01); *F05D 2240/56* (2013.01)

(58) Field of Classification Search
CPC ...... F01D 25/02; F01D 11/02; F05D 220/323; F05D 2240/56; F02K 3/06
See application file for complete search history.

(56) References Cited

U.S. PATENT DOCUMENTS

| | | | | |
|---|---|---|---|---|
| 2,385,662 | A | 9/1945 | Vonnegut | |
| 3,528,241 | A | 9/1970 | Venable et al. | |
| 3,925,979 | A | 12/1975 | Ziegler | |
| 10,724,403 | B2 | 7/2020 | Costa | |
| 10,822,999 | B2 | 11/2020 | Morris et al. | |
| 10,995,631 | B2 | 5/2021 | Raykowski | |
| 2007/0220899 | A1 | 3/2007 | Earith et al. | |
| 2008/0014095 | A1* | 1/2008 | Moniz | F02C 7/045 416/97 R |
| 2014/0050938 | A1* | 2/2014 | Lin | F01D 5/185 427/580 |
| 2017/0335715 | A1* | 11/2017 | Youssef | F02C 3/04 |
| 2019/0024533 | A1* | 1/2019 | Scholtes | F01D 25/02 |

(Continued)

OTHER PUBLICATIONS

German Search Report dated Feb. 23, 2023 from counterpart German Patent Application No. 10 2022 132 856.2.

*Primary Examiner* — Elton K Wong
(74) *Attorney, Agent, or Firm* — SHUTTLEWORTH & INGERSOLL, PLC; Timothy J. Klima

(57) ABSTRACT

The invention concerns an aircraft engine with an intake cone and a fan stage coupled thereto with a plurality of fan blades, wherein the fan blades are each connected to a drive shaft via a connecting means, wherein
a sealing device for blocking air is arranged between a blocking air space and the interior of the intake cone, and during operation of the aircraft engine a leakage air stream flows out of the blocking air space via the sealing device, characterized by at least one outflow means for the leakage air stream in a component of the aircraft engine to allow a flow of the leakage air stream into the interior of the intake cone.

20 Claims, 5 Drawing Sheets

(56) References Cited

U.S. PATENT DOCUMENTS

| | | | | |
|---|---|---|---|---|
| 2020/0032708 | A1* | 1/2020 | Roberge | F04D 29/5853 |
| 2022/0098986 | A1* | 3/2022 | Kim | F01D 5/186 |
| 2023/0126549 | A1* | 4/2023 | Zheng | F04D 29/684<br>415/1 |

* cited by examiner

AIRCRAFT ENGINE AND METHOD FOR TEMPERING A FAN BLADE AND/OR AN INTAKE CONE

This application claims priority to German Application No. 10 2022 132 856.2 filed Dec. 9, 2022, the entirety of which is incorporated by reference herein.

DESCRIPTION

The present disclosure concerns an aircraft engine and a method for tempering a fan blade and/or an intake cone with features as disclosed herein.

Aircraft engines must function reliably even at low temperatures. In principle, there is a danger that below the freezing point, ice forms above all on the external parts of the aircraft engine. Such parts are e.g. the fan blades which form a large attack surface for cold ambient air. Usually, an intake cone is arranged in front of the fan blades around the axis of rotation of the aircraft engine, and is also exposed to icing because of its position.

In principle, de-icing measures are known from U.S. Pat. No. 10,822,999 B2, U.S. Pat. Nos. 2,385,662 A, 10,724,403 B2 and 10,995,631 B2.

The object here is to create efficient devices and methods for heating an aircraft engine.

This object is achieved by means of the aircraft engine having features as disclosed herein.

The aircraft engine here has an intake cone and a fan stage coupled thereto with a plurality of fan blades, wherein the fan blades are each connected to a drive shaft via a connecting means. The drive shaft may be driven by a turbine in the known fashion. The fan blades may here be connected via the connecting means, in particular a fan disc, wherein e.g. the fan blade is connected to the drive shaft via a shaft cone.

Furthermore, in the aircraft engine, a sealing device for blocking air is arranged between the blocking air space and the back of the connecting means (in particular the fan disc), wherein during operation of the aircraft engine, a leakage air stream flows out of the blocking air space via the sealing device. At least one outflow means for the leakage air stream in a component of the aircraft engine here ensures that the leakage air stream can reach the interior of the intake cone. Since the leakage air stream from the interior of the aircraft engine is usually warmer than the external components such as the intake cone, this air stream may be used to heat these components. Because of the pressure conditions in the aircraft engine, no conveying device or similar is required, so that the components can be heated without an external energy supply.

In one embodiment, the component with the outflow means comprises at least one of the connecting means, in particular an arm for a fan blade. In principle, it is possible that all arms of the fan blades are provided with an outflow means for the leakage air stream.

It is possible that the at least one outflow means has at least one opening in the component, in particular in the arm of the fan blade, or the at least one outflow means is formed as an opening in the component, in particular in the arm of the fan blade. The outflow means may thus have a single opening or a plurality of openings. Here the cross-section of the opening of the outflow means may be arranged perpendicularly to the surface of the arm of the fan blade, which is easily achieved e.g. by a bore as an opening.

The cross-section of the opening of the at least one outflow means may thus be circular or elliptical, or have the form of a slot.

Alternatively or additionally, the outflow means may be integrated in a shaft connection of the drive shaft, or be coupled to a shaft connection of the drive shaft. The shaft connection of the drive shaft of the fan stage lies in a region from which the leakage air stream may efficiently be used in the interior of the aircraft engine.

In a further embodiment, the opening of the at least one outflow means in the at least one connecting means may have a blade-like contour (e.g. as part of a slot) on the side oriented towards the blocking air space, so that on rotation of the at least one connecting means, blocking air can be conveyed out of the blocking air space. This conveying effect supports the driving pressure fall.

For an efficient outflow, the largest cross-sectional width of the at least one outflow means may have 0.5 to 5 times the material thickness of the component. Here it is possible that the opening of the at least one outflow means has rounded edges on at least one side. This facilitates the outflow since friction losses are minimised.

In one embodiment, the sealing device may comprise at least a brush seal and/or a labyrinth seal. It is also possible that the sealing device comprises multiple seals and has a more complex structure.

Furthermore, at least one bearing device of the drive shaft may be arranged in the blocking air space.

In one embodiment, in order to create a greater driving pressure difference for the leakage air stream, at least one outflow opening for the leakage air stream may be arranged in the wall of the intake cone to the exterior of the aircraft engine, in particular at the root of the fan blades.

The fan stage is in particular configured as a blisk, i.e. as one piece.

Thus for example, the blocking air can be conducted through openings in the cone of the fan disc or fan blisk into the interior of the intake cone, and emerge between the intake cone and the fan disk.

The object is also achieved by a method having features as disclosed herein.

Here the blocking air may in particular have a temperature between 170 and 240° C., in particular between 200 and 210° C. This temperature is enough to transmit sufficient heat at the destination, i.e. the interior of the intake cone and/or the root region of the fan blades. Because of the inflow of the leakage air stream into the region of the root of the fan blades and/or the inner wall of the intake cone, it is possible to partially or fully temper these to temperatures in the region of the freezing point of water. The temperatures may lie in the range from −5 to 80° C., in particular in the range from 50 to 80° C., quite particularly in the range from 60 to 75° C. As soon as the temperatures have risen accordingly, the ability of the ice to adhere to the metal decreases so that the formed ice can fall away from the engine.

Exemplary embodiments will now be described with reference to the figures, in which, in schematic illustrations:

Figure 1:
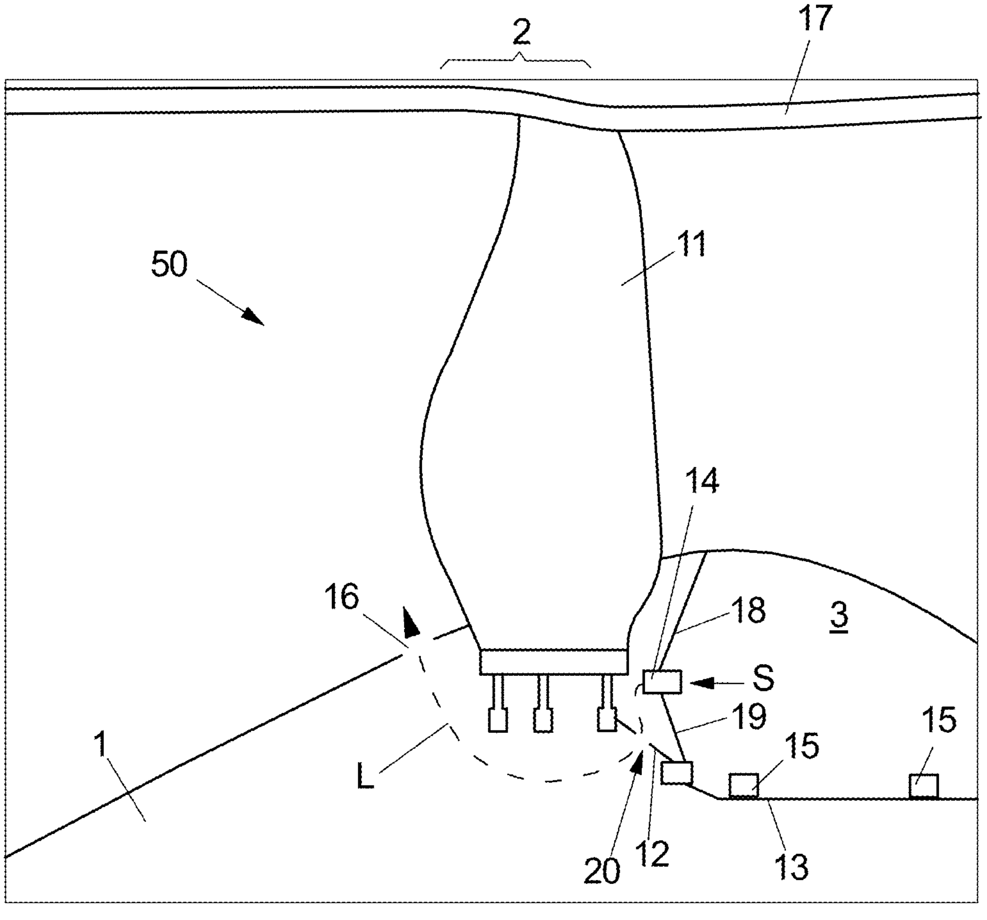
FIG. 1 shows a partial view of a first embodiment of an aircraft engine with means for tempering the fan blades and the intake cone.
Figure 2:
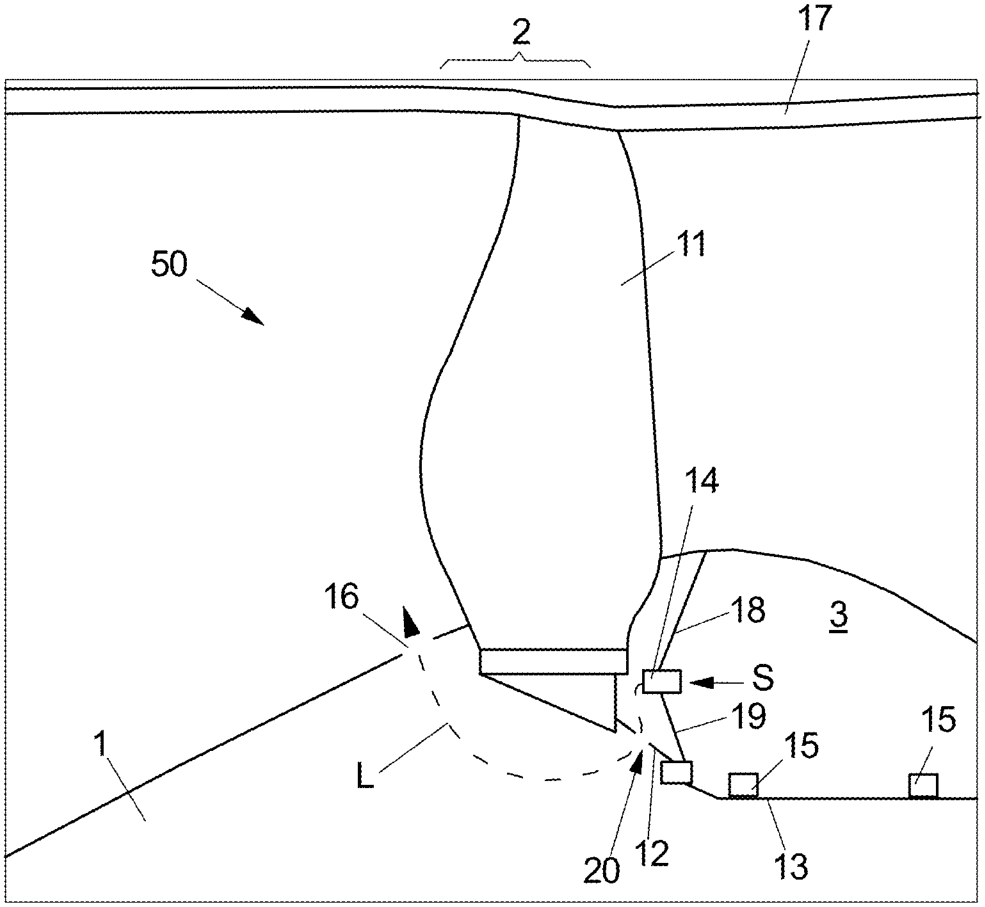
FIG. 2 shows a partial view of a second embodiment of an aircraft engine with means for tempering the fan blades and the intake cone, wherein the fan stage is formed as a blisk.

FIG. 1 shows a sectional view through the front part of an aircraft engine 50 of turbofan design. During operation, air coming from the left flows around the intake cone 1 onto the fan stage 2. In the embodiment shown, the fan stage 2 consists of individual fan blades 11 which are surrounded radially on the outside by a housing 17. The fan blades 11 are each individually connected via an arm 12 to a drive shaft 13 radially to the axis of rotation 51. FIG. 2 shows an alternative embodiment in blisk design.

In the illustration, the drive shaft 13 of the aircraft engine 50 extends to the right up to the turbine stages (not shown here) which set the drive shaft 13—and hence the fan blades 11—in rotation.

The drive shaft 13 is mounted by a row of bearing devices 15 (e.g. configured as ball bearings) which are illustrated schematically in FIG. 1. Further details, known in principle, of an aircraft engine 50 (e.g. compressor stages, turbine stages, combustion chambers etc.) are not shown here for reasons of clarity.

In the first embodiment according to FIG. 1, different thermal conditions prevail in different regions of the aircraft engine 50.

The region of the intake cone 1 and the root region of the fan blades 11, i.e. the radially inner region of the fan blades 11, are particularly exposed to low temperature when the aircraft is e.g. standing outside in cold weather. The intake cone 1, which is hollow on the inside, and the root region of the fan blades 11 are particularly thermally exposed. This may lead to the formation of ice in these regions which must be removed before flight, else parts of the aircraft engine 50 could be damaged.

The embodiments illustrated below indicate means via which any ice which may be present can be efficiently removed, namely by targeted tempering of the intake cone 1, the root region of the fan blades 11 and/or the inner annular chamber of the fan rotor. In particular, ice forms on the pressure side close to the hub and on the annular chamber.

The aircraft engine 50 contains regions in which usually a higher temperature prevails than in the intake cone 1 and/or in the root region of the fan blades 11. Thus in the region around the bearing devices 15, the prevailing temperatures may be higher than 200° C. The cavity around the bearing devices 15 is filled with air and finely atomised oil, which is here described as blocking air S. The pressure in the blocking air space 3 is slightly higher than in the environment of the aircraft engine 50 or the interior of the intake cone 1.

The blocking air space 3 is separated from the interior of the intake cone 1 by a separating face 18, 19. The radially outer part 18 of the separating face is fixedly connected to the aircraft engine and is not movable. The radially inner part 19 of the separating face is connected to the drive shaft 13 so that this radially inner part 19 rotates in operation relative to the radially outer part 18 of the separating face.

Bearing devices 15, which must be lubricated with oil for safe long-term operation, are situated in the interior of the blocking air space 3. To ensure that the oil does not escape from the blocking air space 3 to a significant extent, a sealing device 14, which may comprise e.g. at least one brush seal and/or a labyrinth seal, is arranged between the two parts 18, 19 of the separating face.

The labyrinth seal is a contactless shaft seal, wherein the sealing effect is based on the creation of a space for the fluid with flow barriers consisting of a series of sharp-edged sealing lips and adjacent cavities. The rotating lips move over the standing sealing surface very closely with an extremely small gap. Fluid which tries to flow through the labyrinth seal is alternately accelerated in the narrow gap and then decelerated again in the following cavity, leading to a substantial pressure loss and more or less stopping the throughflow; this forms the basis for the sealing effect. However, it is not possible to achieve absolute tightness with this contactless design, so a leakage air stream L emerges from the sealing device 14 into the interior of the intake cone 1.

In brush seals, a plurality of fibres with a core wire is fixed in a clamping tube to give a flexible seal. Inflowing gases press the wire pack against a support ring. This further compresses the wire pack so that the gas permeability is reduced. Although the fluid losses are smaller than in labyrinth seals, there is still a leakage air stream L which emerges from the blocking air space 3.

The blocking air S in the blocking air space 3 has a relatively high temperature which, in the embodiment shown, is used for heating components in the front engine part (i.e. the intake cone 1 and/or the root region of the fan blades).

In order to achieve this efficiently, at least one outflow means 20 for the leakage air stream L is arranged in a component 12 of the aircraft engine 50. In the embodiment illustrated in FIG. 1, the component 12 forms a type of border between the blocking air space 3 and the interior of the intake cone 1. The outflow means 20 makes this component 12 permeable, or at least more permeable, for the leakage air stream L.

In the embodiment according to FIG. 1, the component 12 is formed by the plurality of arms of the fan blades 11, wherein the arms each form a connecting means 12 between the fan blades 11 and the drive shaft 13. In principle however, other components may be used, e.g. a wall, which is made more permeable for the leakage air stream L by the outflow means 20. In addition or alternatively, it is also possible to integrate the outflow means 20 in another component of the aircraft engine 50, as illustrated in FIG. 1C.

FIG. 1 shows a further means which additionally supports the outflow of the leakage air stream L, utilising the different pressure conditions in the aircraft engine 50. As stated, the pressure in the blocking air space 3 is comparatively high. An outflow opening 16 for the leakage air stream in the wall of the intake cone 1, in particular at the root of the fan blades 11, creates a connection to the exterior of the aircraft engine 50, so the leakage air stream L leaves the interior of the intake cone 1 via the outflow opening 16.

By choosing the location of the outflow opening 16 close to the front side of the fan blades 11, it can be ensured that the warm leakage air stream L flows in targeted fashion in particular around the root of the fan blades 11 and the inner annular chamber. Any ice present in this region can thus be thawed or at least softened so that it can easily be removed during operation of the aircraft engine 50. The adhesion strength of ice on metal surfaces decrease greatly even at temperatures below but close to freezing point (between −5° C. and −1° C.). That is enough for the ice to detach under the centrifugal force acting on the ice during operation. A build-up of large, thick ice layers over a longer period is thus prevented by regular detachment of the ice. Thus even a very slight heating of the metal is sufficient for the function.

Figure 1A:
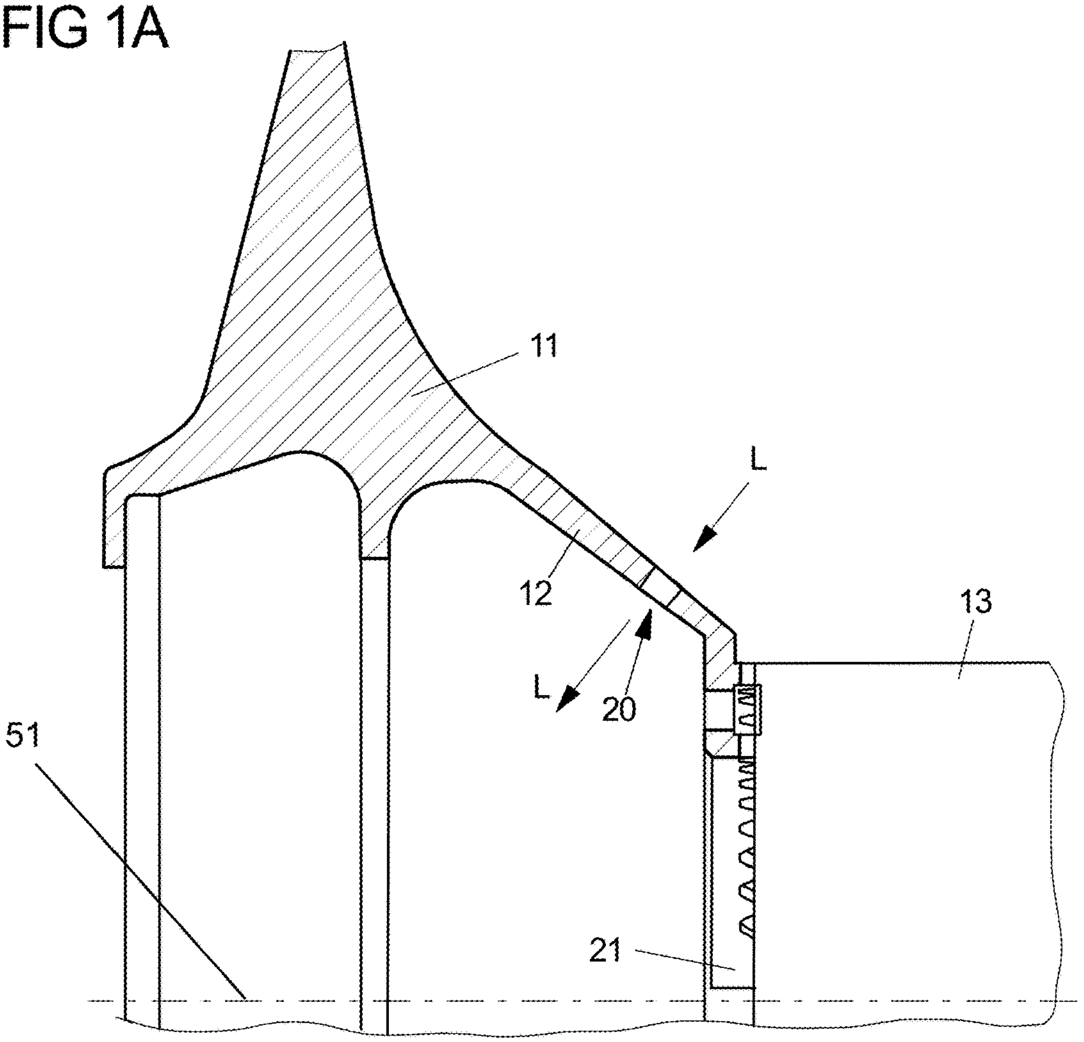
FIG. 1A shows an enlarged illustration of an outflow means of a leakage air stream in a connecting means (arm) between a fan blade and a drive shaft.

FIG. 1A shows an enlargement of the region of such an arm of the fan blade 11. The connecting means 12 between the fan blade 11 and the drive shaft 13 here has a channel as an outflow means 20, connecting the blocking air space 3 to the interior of the intake cone 1. Thus the leakage air stream L can flow through this outflow means 20. In the embodiment shown, the outflow means 20 is formed by a bore, so that the cross-section of the outflow means 20—and hence also of the two openings of the outflow means 20—is circular.

The diameter of the bore of the outflow means 20 corresponds approximately to the thickness of the connecting means 12, e.g. in the order of 10 mm. In principle, the largest free cross-section may be 0.5 to 5 times the material thickness of the component 12.

In alternative embodiments not shown here, the cross-section of the outflow means 20 is not circular, e.g. may also be elliptical. Also, it is not essential for the connecting means 12 to have only a single channel, as shown in FIG. 1A. The outflow means 20 may also comprise a plurality of channels of the same or different shape. In such embodiments, the mechanical stability of the connecting means 12 must always be taken into account, since these components are heavily loaded. It may be suitable to use only a single bore as an outflow means 20.

It is not essential for an opening to be arranged in every part of the connecting means 12 of the fan blades 11 as an outflow means 20. It is e.g. possible to provide a bore in every second connecting means 12 of the fan blades 11.

FIG. 1A furthermore shows that the opening of the at least one outflow means 20, at least on the side oriented towards the blocking air space 3, has rounded edges to ensure an outflow with minimum losses.

Figure 1B:
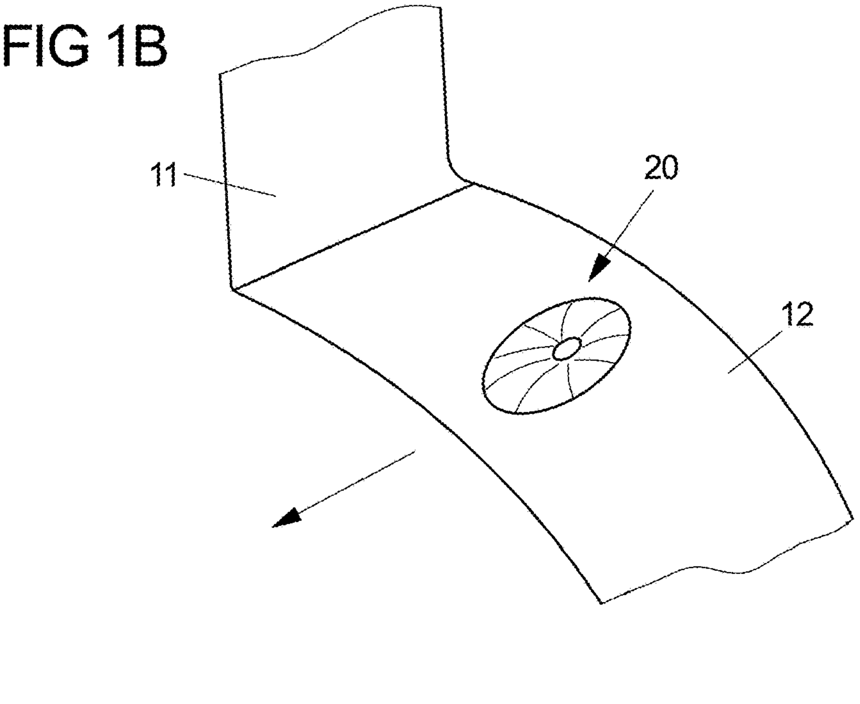
FIG. 1B shows a detail illustration of a further embodiment of an outflow means with a slot.
Figure 1C:
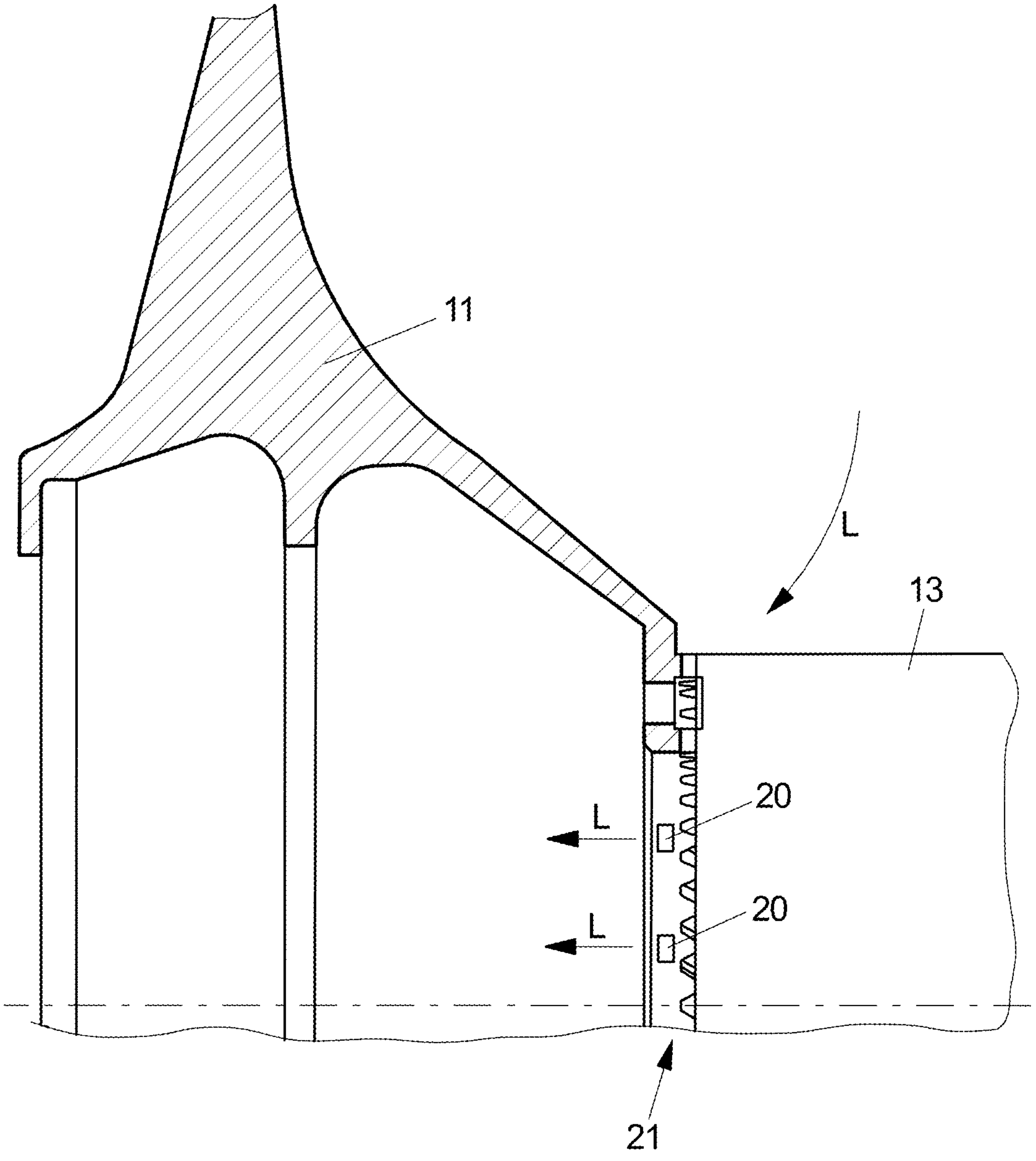
FIG. 1C shows an illustration of a further embodiment of an outflow means in a shaft connection.

FIG. 1B shows a further variant of the outflow means 20 in the connecting means 12, which comprises a type of slot. The slot is wider on one side than on the other side. If the connecting means 12 now rotates (indicated by an arrow in FIG. 1B), the blocking air S is drawn in through the wide part of the slot and pushed through the opening in the narrow part of the slot. Thus the blocking air S may be actively conveyed out of the blocking air space 3, so that not only a pressure-operated transport is possible. Here the slot acts as a type of vane for the blocking air S, wherein in principle other vane shapes are possible via which the blocking air S can be conveyed.

FIG. 1C shows a variant of the embodiment according to FIG. 1A, so reference may be made to the above description. In contrast to the embodiment illustrated in FIGS. 1 and 1A, the outflow means 20 is not made in the arm of the fan blades 11, but the outflow means 20 comprises two openings in a shaft connection 21 of the fan blades 11 to the drive shaft 13. Fluidically, the shaft connection 21 and the drive shaft 13 also separate the blocking air space 3 from the interior of the intake cone 1.

The shaft connection 21 may here e.g. be designed as a type of face toothing (e.g. as a curvic coupling) in which an opening for the blocking air S is arranged at one or more points as an outflow means 20, as illustrated schematically in FIG. 1C.

FIG. 1 shows a first embodiment in which the fan blades 11 are connected to the drive shaft 13 as individual components.

In a second embodiment illustrated in FIG. 2, the fan stage 2 is formed as a blisk. Blisk technology allows a reduction of engine mass by the omission of individual blade roots, and hence a gain in payload/range for the aircraft. The combination of low production costs and repair costs means that the costs of both spare parts and maintenance are low.

The fan stage 2 thus forms a component which is connected to the drive shaft 13. Thus a part of the fan stage 2 itself forms a component 12 between the blocking air space 3 and the interior of the intake cone 1. In this way, also the at least one outflow means 20 for the leakage air stream L may be arranged in this component between the blocking air space 3 and the interior of the intake cone 1, in particular in the arm which serves as a connection between the drive shaft 13 and fan blades 11.

Other than in the blisk design, the second embodiment does not differ from the first embodiment shown in FIG. 1. The embodiments according to FIGS. 1A and 1C can also be used for the blisk construction.

Figure 3:
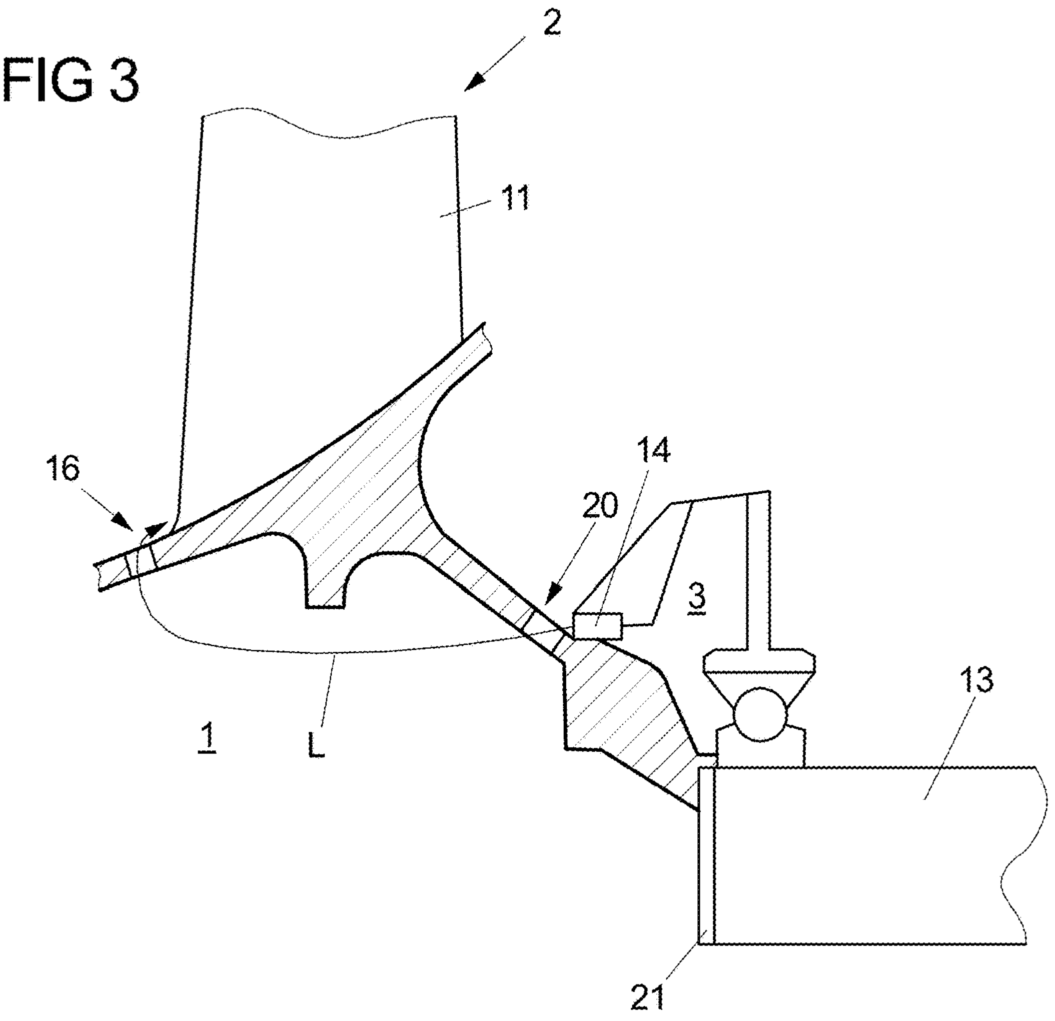
FIG. 3 shows a schematic and enlarged sectional view of an outflow means.

In FIG. 3, the region of the connecting means 12 to an opening as an outflow means 20 is shown enlarged. The fan stage 2 is here configured as a blisk, as in the embodiment in FIG. 2. The connecting means 12 is connected to the drive shaft 13 via the shaft connection 21.

The blocking air S partly emerges from the sealing device 14 as a leakage air stream L into the interior of the intake cone 1. The outflow opening 16, which creates a connection to the exterior of the aircraft engine 50, is arranged in the wall of the intake cone 1. Because of the prevailing pressure conditions and the spatial arrangement of the outflow opening 16, a flow is created in the interior of the intake cone 1, wherein the leakage air stream L flows intensively around the root region of the fan blades 11, causing an improved heat transfer.

Figure 4:
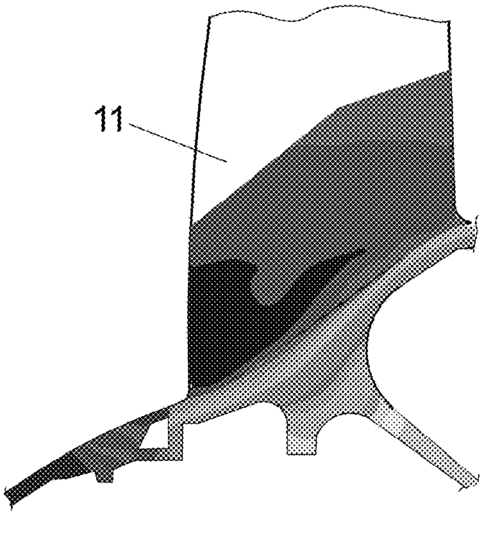
FIG. 4 shows a schematic view of the isotherms at the root of a fan blade.

FIG. 4 shows, by means of isothermals (here illustrated as grey stages), the effect of heating of the intake cone 1 and the root region of the fan blades 11. During operation, an absolute rise in temperature of 20 to 40° C. (compared with the state without heating) in the root region of the fan blades 11 can be achieved without the need to operate an external heat source. The embodiments illustrated here use the heat of the blocking air S which is present in any case.

LIST OF REFERENCE SIGNS

- 1 Intake cone
- 2 Fan stage
- 3 Blocking air space
- 11 Fan blade
- 12 Component, connecting means (arm) of fan blade and drive shaft
- 13 Drive shaft
- 14 Sealing device
- 15 Bearing device of drive shaft
- 16 Outflow opening for leakage air stream
- 17 Housing
- 18 Outer part of a separating face between blocking air space and interior of intake cone
- 19 Inner part of a separating face between blocking air space and interior of intake cone
- 20 Outflow means for leakage air flow in component
- 21 Shaft coupling
- 50 Aircraft engine
- 51 Axis of rotation
- L Leakage air stream
- S Blocking air

The invention claimed is:

1. An aircraft engine comprising:

an intake cone and a fan stage coupled thereto with a plurality of fan blades, wherein the fan blades are connected to a drive shaft via a connector, a sealing device for blocking air is arranged between a blocking air space and the back of the connector and during operation of the aircraft engine a leakage air stream flows out of the blocking air space via the sealing device, at least one outflow passage for the leakage air stream in a component of the aircraft engine to allow a flow of the leakage air stream into the interior of the intake cone;

at least one bearing device of the drive shaft being arranged in the blocking air space.

2. The aircraft engine according to claim 1, wherein the component comprises at least a portion of the connector.

3. The aircraft engine according to claim 1, wherein the at least one outflow passage comprises at least one opening in the component, or the at least one outflow passage is formed as an opening in the component.

4. The aircraft engine according to claim 3, wherein a cross-section of the at least one opening is arranged perpendicularly to a surface of an arm of at least one of the fan blades.

5. The aircraft engine according to claim 3, wherein the at least one opening is formed as a bore.

6. The aircraft engine according to claim 3, wherein a cross-section of the at least one opening is circular or elliptical or is shaped as a slot.

7. The aircraft engine according to claim 3, wherein the at least one opening has a tapering contour on a side oriented towards the blocking air space, so that on rotation of the at least one connector, blocking air is conveyed out of the blocking air space.

8. The aircraft engine according to claim 3, wherein the at least one opening has rounded edges on at least one side.

9. The aircraft engine according to claim 1, wherein the outflow passage is integrated in a shaft connection of the drive shaft or is coupled to a shaft connection of the drive shaft.

10. The aircraft engine according to claim 1, wherein a largest cross-sectional width of the at least one outflow passage is 0.5 to 5 times a material thickness of the component.

11. The aircraft engine according to claim 1, wherein the sealing device comprises at least one brush seal and/or a labyrinth seal.

12. The aircraft engine according to claim 1, and further comprising at least one outflow opening for the leakage air stream in a wall of the intake cone to an exterior of the aircraft engine, at a root of the fan blades.

13. The aircraft engine according to claim 1, wherein the fan stage is configured as a blisk.

14. The aircraft engine according to claim 1, wherein the blocking air is conducted through openings in a fan disc or a fan blisk into the interior of the intake cone, and emerges between the intake cone and the fan disk or the fan blisk.

15. The aircraft engine according to claim 1, wherein the connector is a fan disc.

16. A method for tempering a fan stage and/or an intake cone of an aircraft engine:

wherein the fan stage has a plurality of fan blades and the fan blades are connected to a drive shaft via a connector, wherein the aircraft engine furthermore has a sealing device for blocking air between a blocking air space and a back of the connector, wherein during operation of the aircraft engine, a leakage air stream flows out of the blocking air space via the sealing device, providing at least one outflow passage for targeted guidance of the leakage air stream in a component of the aircraft engine, to allow a flow of the leakage air stream into an interior of the intake cone, wherein the leakage air stream has a temperature which is higher than at least one region in the intake cone and/or at least one of the fan blades, providing at least one bearing device of the drive shaft arranged in the blocking air space.

17. The method according to claim 16, wherein the blocking air has a temperature between 17° and 240° C.

18. The method according to claim 17, wherein the blocking air has a temperature between 20° and 210° C.

19. The method according to claim 16, wherein a region of a root of the fan blades and/or an inner wall of the intake cone is partially or fully tempered by the inflow of the leakage air stream to temperatures between −5 and 80° C.

20. The method according to claim 16, wherein a region of a root of the fan blades and/or an inner wall of the intake cone is partially or fully tempered by the inflow of the leakage air stream to temperatures in a range from 50 to 80° C.

* * * * *